United States Patent [19]

Petersson et al.

[11] Patent Number: 5,754,950
[45] Date of Patent: May 19, 1998

[54] METHOD AND APPARATUS FOR COMBINING SIGNALS

[75] Inventors: Sven Oscar Petersson, Partille; Jonny Lennart Dahlberg, Göteborg; Björn Christer Ivarsson, Varberg, all of Sweden

[73] Assignee: Telefoanktiebolaget LM Ericsson, Stockholm, Sweden

[21] Appl. No.: 569,598

[22] Filed: Dec. 8, 1995

[30] Foreign Application Priority Data

Dec. 12, 1994 [SE] Sweden ................................. 9404310

[51] Int. Cl.⁶ ........................................ H04B 1/06
[52] U.S. Cl. .................. 455/273; 455/137; 455/276.1; 375/347; 375/267
[58] Field of Search ............................. 375/267, 347; 455/132, 137, 139, 273, 276.1

[56] References Cited

U.S. PATENT DOCUMENTS

| | | | |
|---|---|---|---|
| 4,173,759 | 11/1979 | Bakhru | 343/100 |
| 5,461,646 | 10/1995 | Anvari | 375/347 |
| 5,490,180 | 2/1996 | Muto | 375/347 |

FOREIGN PATENT DOCUMENTS

| | | |
|---|---|---|
| 0272236 | 6/1988 | European Pat. Off. |
| 61-134102 | 6/1986 | Japan |
| 90/16118 | 12/1990 | WIPO |

*Primary Examiner*—Reinhard J. Eisenzopf
*Assistant Examiner*—Darnell R. Armstrong
*Attorney, Agent, or Firm*—Burns, Doane, Swecker & Mathis, L.L.P.

[57] ABSTRACT

In a radio receiver, a method and apparatus combine signals received by physically separated antennas. The amplitude of each received signal is limited. The amplitude limited signals are demodulated, and the demodulated signals are combined to form an output signal in which each demodulated signal constitutes a part in relation to a weight factor. The weight factor of the demodulated signal with a corresponding received signal having the lowest amplitude is given the value 1.

12 Claims, 1 Drawing Sheet

METHOD AND APPARATUS FOR COMBINING SIGNALS

BACKGROUND

The present invention relates to a method, using a limited dynamic range, for combining signals from different receiver antennas in a diversity receiver.

The present invention also relates to an apparatus, using a limited dynamic range, for combining signals from different receiver antennas in a diversity receiver.

In modern radio communication systems, information is normally transferred in a digital form. In such systems different types of modulation/coding of the carrier wave signal that are used for the transfer, are utilized. In the receivers, the received signal has to be "decoded" with the help of, among other things, clock signals that are extracted from the transferred signal. If the quality of the received signal is bad or varies there can, of course, arise errors during, among other things, the decoding.

To reduce the influence of a poor transfer quality, so called channel coding is utilized, which means that the information that is to be transferred is "supplemented" with known additional information which is used later in the receiver to detect and "correct" transfer errors. However, these measures are in many cases not sufficient but have to be replaced or supplemented with other methods. Consequently, the fading that frequently occurs in radio communication is a problem that reduces the quality of the received signal and that therefore needs to be reduced.

Fading depends upon, among other things, that the receiver receives signals that have propagated along different and various paths from the transmitter. The problem is especially prominent if the transmitter and/or the receiver are mobile as is the case with data transfer with mobile units, such as mobile telephones.

To eliminate the influence of fading, different types of diversity methods are used such as time and frequency diversity or antenna diversity. With antenna diversity the faded signals are combined from a plurality of physically separated receiver antennas in a way that improves the signal to noise ratio in the combined signal.

The signals from the different antennas can be combined/chosen according to different criteria. It is thus possible to choose the signal that is momentarily the strongest, directly add the signals, combine the signals depending on their mutual relative strength, choose/combine signals depending on their phase position/error etc.

The so called MRC method (Maximum Ratio Combining) is a well known method for combining antenna signals. During the combining of the signals from the different antennas there are however according to this method, among other things, multiplications of signal amplitudes. When the antenna signals have a large dynamic range the dynamics requirements for the parts of the signal processing that processes the combined signal are very large.

SUMMARY

One object of the invention is thus to provide a method and an arrangement which combines signals received by different antennas in a radio receiver in a way that combines the favourable characteristics against fading of the MRC method with minimal requirements of dynamic range in the signal processing.

A further object of the invention is to, with the restricted dynamic range, keep the possibility for error correction in channel coded systems with the use of so called "soft information".

These objects are achieved according to a method, according to which the requirements of dynamics/dynamic range are reduced by a split of the received signals. A part of the signal thus carries the phase information and a second part carries the amplitude information. The part that carries the phase information is limited before demodulation. The received and demodulated signals are combined to an output signal whereby each demodulated signal is given a weight factor. The weight factor for the demodulated signal whose corresponding received signal has the lowest amplitude of the received signals is set to 1. Apart from the combined output signal, "soft information" is also derived, which is a measure of the quality of the output signal and which can be used to improve the error correction capability in the subsequent channel decoding.

These objects are also achieved by means of an arrangement in which amplitude limiting devices limit the amplitude of the received signals. After demodulation in demodulators the demodulated signals are combined in a summation device to form the output signal of the arrangement, whereby each demodulated signal is given a weight factor. The weight factor for the demodulated signal whose corresponding received signal has the lowest amplitude of the received signals, is set to 1. The arrangement also comprises logarithmic conversion devices which compute the logarithm of the amplitude of the received signals, which results in reduced requirements of dynamics/dynamic range and a simplification of the computation unit that performs the computations of the weight factors and soft information.

DETAILED DESCRIPTION

Figure 1:
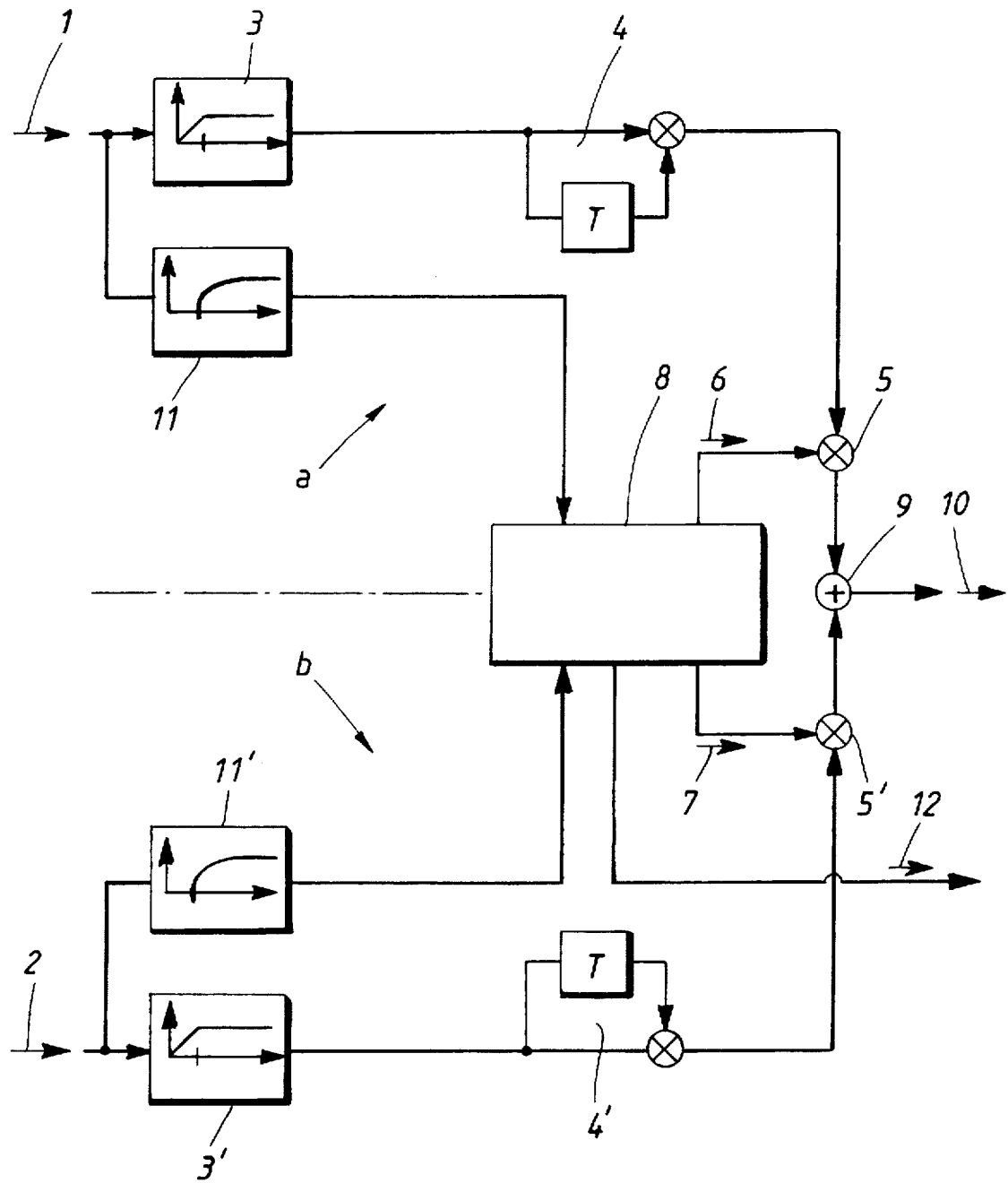
FIG. 1 shows a block diagram of a preferred embodiment of the invention.

The method according to the invention can be said to be based on the fact that demodulation of phase coded signals does not require any amplitude accuracy for the signal that is to be demodulated. Due to this there exists a possibility to limit the signals that are to be demodulated before the demodulation processing. Through limiting, only a very limited dynamic range in the demodulation devices is required.

This can be used in a device for diversity reception where the signals received by the different antennas are to be demodulated, after among other things frequency conversion to the base band. As the demodulated signals after demodulation are to be combined/selected some sort of numerical value is however required that determines which signal is to be chosen or decides how the combining is to be carried out, for example by determining weight factors for the different signals. As a base for the determination of the weight factors the logarithmic conversion of the amplitude of the signals is also performed according to the invention before the limiting. Doing the logarithmic conversion also means that the dynamics/dynamic range requirements are reduced for certain parts of the signal processing.

The logarithmically converted signals are thus used for the computation of weight factors that determines how the demodulated signals are to be combined to an output signal. During the calculation of the weight factors, the weight factor for the demodulated signal that originates from the receiving branch whose signal has the lowest value is set to the value 1.0. In a further development of the invention the logarithmically converted signals are also used to calculate a value that can be said to form a measure of the quality of the combined signal—from now on to be referred to as "soft information"—which can be used in channel coded systems to improve the ability to perform error correction.

A detailed description of the determination of weight factors and soft information will follow below with regard to an example with two receiving branches, referred to as branch a and branch b. The indexes a and b indicate signals etc. that relate to the branches a and b respectively.

The two signals acquired from the receivers can in a conventional manner be described as:

$$A(n) \cdot e^{j\alpha(n)} \text{ and } B(n) \cdot e^{j\beta(n)} \text{ respectively} \quad (A)$$

where $A(n)$ and $B(n)$ are the n:th amplitude sample of the signal in the receiving branches a and b respectively and $\alpha(n)$ and $\beta(n)$ are corresponding phase angles. The signals are assumed, in this example, to be differentially coded. However, this is not a prerequisite for the implementation of the method but also other types of phase coding can be used. The two signals according to (A) are differentially demodulated whereby a sample is multiplied with the complex conjugate of the previous sample. With other types of phase coding a coherent demodulation can, for example, be executed. After demodulation the signals can be expressed as:

$$A(n+1) \cdot A(n) \cdot e^{j(\alpha(n+1)-\alpha(n))} \text{ and } B(n+1) \cdot B(n) \cdot e^{j(\beta(n+1)-\beta(n))} \quad (B)$$

These signals are combined to a vector whose absolute value is the earlier mentioned soft information, i.e. a measure of the amplitude of the combined signal. As the signal amplitudes are varying slowly then $A(n+1) \approx A(n)$ and $B(n+1) \approx B(n)$ and the combined signal vector $C(n)$ can therefore be expressed as:

$$C(n) = A^2(n) \cdot e^{j\Delta\alpha} + B^2(n) \cdot e^{j\Delta\beta} = B^2(n) \left[ \frac{A^2(n)}{B^2(n)} \cdot e^{j\Delta\alpha} + e^{j\Delta\beta} \right] \quad (C)$$

The amplitude of $C(n)$ can, due to the assumption that $\Delta\alpha \approx \Delta\beta$, be approximated to:

$$|C(n)| \leq B^2(n) \cdot \left[ \frac{A^2(n)}{B^2(n)} + 1 \right] \quad (D)$$

If the receiver branch b is assumed to have the weakest signal, then the weight factor $w_b$ is set to equal 1 for this branch. As will become apparent from the continued disclosure this means that a simplification of one less multiplication in the calculations can be done. If in addition the weight factor $w_a$ for the receiving branch a is set to $A^2(n)/B^2(n)$ then the combined vector can be written as:

$$C(n) = B^2(n)[w_a \cdot e^{j\Delta\alpha} + w_b \cdot e^{j\Delta\beta}] \quad (E)$$

i.e. the weight factors for the demodulated signals are formed by the quadratic relationship between the amplitude of the corresponding received signal and the amplitude of the received signal whose amplitude has the lowest value of the amplitudes of the received signals. During the derivation of the expression (E) no consideration has been given to limitations. If an extreme limitation is performed before demodulation the combined vector becomes:

$$C_{lim}(n) = const \cdot (w_a \cdot e^{j\Delta\alpha} + e^{j\Delta\beta}) \quad (F)$$

and carries the same phase information as $C(n)$ in the expression (E). It is thus sufficient from a phase information point of view to calculate the expression (F).

As has been mentioned earlier, the base band signals are logarithmically converted to keep down the requirements of dynamics. The logarithmic conversion implies a further advantage by reducing multiplications and divisions to additions and subtractions respectively. As a consequence of this, it is advantageous to, instead of calculating the soft information according to expression (D), determine the corresponding logarithm, i.e.:

$$\log|C(n)| \leq \log B^2(n) + \log(w_a+1) = 2 \cdot \log B(n) + \log(w_a+1) \quad (G)$$

The soft information is thus given by the logarithmic conversion of the signal amplitude in the receiving branch that has the lowest amplitude and the logarithmic conversion of the sum of the weight factors.

Further simplifications in the calculations can be achieved if tables are created comprising the value of $\log(w+1)$ as a function of the differences between the logarithmic conversion of the signal amplitudes of the two branches. Here w denotes the weight factors in the branch that has the strongest signal.

Calculations have shown that by means of the described method with a "hard" decoding, i.e. without the use of soft information, performance characteristics identical with those in the case of total dynamics are attained. With soft decoding the method attains a moderate loss. The calculations have also shown that the dynamics of the weight factors can be as low as in the order of 10 dB without influencing the quality of the output signal to any large extent.

In the disclosure of the invention it was assumed that the receiving branch b had the weakest signal. It should, however, be clear from the description that a corresponding discussion and derivation of expressions can be carried out for the case that the a branch has the weakest signal.

It is shown in FIG. 1 a device that constitutes an example of an application of the method. The device comprises two "branches" generally represented with a and b respectively. Units/functions that are identical in the FIGURE have been given the same reference numeral with the only difference that in the b branch they have been provided with a ' character.

The two branches are each fed with a differentially phase coded input signal, 1 and 2 respectively, which are composed of the specified signals in the (A) expression. The input signals are limited in limiting devices (limiters) 3 and 3' whereafter a differential demodulation is performed in demodulation devices 4 and 4'. In these, the limited signals are phase detected against the conjugate of the limited signals, delayed with the time T. T corresponds to the time for a so-called symbol interval.

The demodulated signals are multiplied in multiplication devices 5 and 5' with a first and a second signal, 6 and 7 respectively, from a calculation device 8. The signals 6 and 7 are composed of the weight factors $w_a$ and $w_b$ respectively, and mentioned in connection with the expressions (C) and (D). As the weight factors in one of the branches (the one with the lowest amplitude) is set=1 no multiplication is required in this branch, which simplifies the calculations.

The acquired weighted signals from the multipliers 5 and 5' are combined in a summation device 9 to an output signal 10 that constitutes the mentioned signal in the expression (F). The output signal 10 then proceeds for continued signal processing such as symbol decoding. This continued signal processing is however outside the boundaries of the present invention and is therefore not described.

The two input signals 1 and 2 are fed to the limiters 3 and 3' and also fed to the logarithmic conversion devices 11 and 11'. The output signal from these devices, i.e. the logarithmically converted input signals, are connected to calculation device 8.

The calculation device 8 performs several tasks. It calculates the weight factors and in applicable cases also the previously mentioned soft information. The soft information makes up a third output signal 12 from the calculation device. This signal is a measure of the quality of the output signal 10 and is used during channel decoding to improve the error correction capability.

Because the input signals 1 and 2 are logarithmically converted the dynamics/dynamic range of the signals decreases and the calculation of weight coefficients is facilitated as these, which are made up of quotients between the amplitudes of the received signals, can be calculated with subtractions. However, in the described example of an embodiment, they need to be converted by antilogarithmic conversion operations before they are fed to the multipliers 5 and 5'. Corresponding advantages are also attained for determination of the soft information, i.e. the signal according to expression (D).

The calculations performed in the calculation device 8 can be realized in different ways depending on the physical appearance of the device. To realize the calculation device in a suitable way so that the calculations are performed in the previously described manner is however well known and is within the competence of a person skilled in the art, which is why it is not accounted for in the description.

The requirement of dynamic range has been considerably reduced in the arrangement according to the invention, both in the parts of the arrangement that have a connection to demodulation of the received signals as well as in the parts where the calculations of the weight factors and soft information is performed. Despite the reduced dynamics, a combined signal is acquired whose quality is totally comparable with what would have been attained in corresponding arrangements with complete dynamics/large dynamic range. Furthermore, a signal that is used during channel decoding is obtained from the arrangement according to the invention.

In the discussed example it has been assumed that only two signals are to be combined for the purpose of facilitating the understanding of the invention. However, there is nothing to prevent more signals being combined in the described manner.

The description of the invention is to be understood as examples of different embodiments. The invention is thus not restricted to the above described embodiments, but can be varied within the scope of the appended claims.

What is claimed is:

1. In a radio receiver, a method for combining signals received by physically separated antennas, comprising the steps of:

limiting an amplitude of every received signal;

demodulating the amplitude limited signals;

calculating weight factors for each of the demodulated signals, wherein a weight factor for a demodulated signal with a corresponding received signal having a lowest amplitude of the received signals is given the value 1;

multiplying each demodulated signal by a corresponding weight factor to form weighted signals; and combining the weighted signals to form an output signal.

2. The method according to claim 1, wherein the step of calculating includes calculating a weight factor by forming a quadratic relationship between the amplitude of a received signal and the amplitude of the received signal having the lowest amplitude of the received signals.

3. The method according to claim 2, wherein the received signals are phase coded, and the step of demodulating includes coherent phase detection.

4. The method according to claim 2, wherein the received signals are differentially phase coded, and the step of demodulating includes differential phase detection.

5. The method according to claim 1, wherein the step of calculating includes a step of calculating a numerical value to be used as a measure of the quality of the output signal.

6. The method according to claim 5, further comprising a step of logarithmically converting the received signals, wherein the numerical value is calculated from a logarithm of the amplitude of the received signal having the lowest amplitude of the received signals and a logarithm of the sum of the weight factors.

7. In a radio receiver, a device for combining signals received by physically separated antennas comprising:

a limiting device for limiting every amplitude of the received signals;

a demodulator for demodulating the amplitude limited signals;

a calculating device for calculating weight factors for each of the demodulated signals, wherein a weight factor for a demodulated signal with a corresponding received signal having a lowest amplitude of the received signals is given the value 1;

a multiplying device for multiplying the demodulated signals by the corresponding weight factors to form weighted signals; and a summation device for combining the weighted signals to form an output signal.

8. The device according to claim 7, wherein the calculating device calculates a weight factor by forming a quadratic relationship between the amplitude of a received signal and the amplitude of the received signal having the lowest amplitude of the received signals.

9. The device according to claim 7, wherein the received signals are phase coded, and the demodulating device comprises a coherent phase detector.

10. The device according to claim 7, wherein the received signals are differentially phase coded, and the demodulating device comprises a differential phase detector.

11. The device according to claims 7, wherein the calculating device calculates a numerical value to be used as a measure of the quality of the output signal.

12. The device according to claim 11, further comprising:

a logarithmic converting device for logarithmically converting the received signals, wherein the calculating device calculates the numerical value from a logarithm of the amplitude of the received signal having the lowest amplitude of the received signals and a logarithm of the sum of the weight factors.

* * * * *